US006495995B2

United States Patent
Groom et al.

(10) Patent No.: US 6,495,995 B2
(45) Date of Patent: Dec. 17, 2002

(54) SELF-CLOCKING MULTIPHASE POWER SUPPLY CONTROLLER

(75) Inventors: Terry J. Groom, Durham, NC (US); Stuart Pullen, Raleigh, NC (US); Kwang H. Liu, Sunnyvale, CA (US)

(73) Assignee: Semtech Corporation, Morrisville, NC (US)

( * ) Notice: Subject to any disclaimer, the term of this patent is extended or adjusted under 35 U.S.C. 154(b) by 0 days.

(21) Appl. No.: 09/802,840

(22) Filed: Mar. 9, 2001

(65) Prior Publication Data

US 2002/0125869 A1 Sep. 12, 2002

(51) Int. Cl.$^7$ ................................................ G05F 1/40
(52) U.S. Cl. ............................................. 323/283
(58) Field of Search ............................ 323/282, 283, 323/287, 351

(56) References Cited

U.S. PATENT DOCUMENTS 4,439,821 A  * 3/1984  Grippe ........................ 363/26

6,204,714 B1  * 3/2001  Milshtein et al. ........... 327/299

* cited by examiner

Primary Examiner—Adolf Deneke Berhane
(74) Attorney, Agent, or Firm—Coats & Bennett, P.L.L.C.

(57) ABSTRACT

A ripple-mode controller provides reliable operation in multi-phase power supply circuits, over a variety of operating conditions. Cross-phase blanking allows the controller to preserve the desired phase relationship between the switching pulses its provides to the different output phases, and permits the controller to operate each output phase at nearly 100% duty cycles. Active current sharing compliments blanking operations by adjusting the width of switching pulses the controller provides to one or more of the output phases based on detecting load current imbalances between the different output phases. With active current sharing, the controller prevents one or more output phases from carrying excessive portions of the load current. Further complimenting its operation, the controller may include virtual ripple generation to increase the noise immunity of its ripple-mode regulation.

65 Claims, 13 Drawing Sheets

SELF-CLOCKING MULTIPHASE POWER SUPPLY CONTROLLER

BACKGROUND OF THE INVENTION

The present invention relates to power regulation, and particularly relates to switch-mode power supplies.

Advances in one area of technology often require commensurate advances in supporting technologies to realize the full benefit of the advance. For example, observers of the microprocessor industry are familiar with "Moore's Law," which posits that the complexity of semiconductor devices doubles every two years. Microprocessor development arguably represents the most dramatic illustration of Moore's Law. Pioneering microprocessors released in the 1970's operated at clock speeds well under 500 KHz, and included fewer than five thousand transistors. Modern microprocessors operate at clock speeds in excess of 1 GHz and include millions of transistors. Exploiting these dramatic gains required advances in a host of supporting technologies, from advances in memory technology and circuit fabrication, to advances in power supply design.

Indeed, modern microprocessors could not provide their dramatic performance gains absent today's sophisticated power supplies. For example, high-end microprocessors can consume in excess of 80 Watts of power and operate at 2 VDC or less. These requirements translate into power supply output current requirements in excess of 40 Amps, yet the power supply must maintain tight output voltage regulation, even when faced with dramatic step changes in output current. In general, modern electronic systems require responsive power supplies capable of providing relatively clean power at well-controlled voltages, over a wide range of quickly changing load conditions.

Often, the requirements placed on electronic power supplies include the dual requirements of good transient response and high efficiency. Linear voltage regulation, where a pass element such as a transistor, is used to drop a supply voltage down to a regulated value have good transient response, but can be inefficient. Linear regulation inefficiency rises with increasing input/output voltage differential. Because of the high current required by high-performance electronic systems, many primary power supplies provide a relatively high voltage, such as 12 or even 24 VDC. Regulating such voltages down to 2 VDC or less, as is common for high-performance microprocessor cores, is impractical using linear regulation.

Switch mode power regulation offers an opportunity for improved efficiency as compared to linear regulation. In switch mode power supplies, one or more reactive circuit elements are rapidly switched from one configuration to another to control the energy flowing into and out of a reactive circuit element or elements. By using reactive elements for energy storage, switch mode power supplies, sometimes referred to as switching regulators, minimize power losses when converting from one voltage to another. However, switch mode power supplies entail a host of potential problems that sometimes offset their good efficiencies.

For example, the transient response of switch mode power supplies can be compromised depending upon the control topology employed. Generally, the signal being regulated by the switch mode power supply is fed back so that the regulator can adjust some characteristic of its switching operations to maintain the desired output voltage. In certain feedback implementations, relatively slow error amplifiers reside within the control feedback loop, making the switch mode power supply slow to respond to fast load transients. Fast load transients are common in microprocessors and other complex circuits that operate under dynamic conditions.

So-called "ripple-mode" regulators use a relatively simple control feedback loop based essentially on high-speed comparator circuits that compare the regulated output voltage, or some signal proportional to the regulated output voltage to a desired output level. The regulated output signal includes some amount of ripple, arising from the switching actions of the switch mode power supply. Switching control response is improved by eliminating error amplifiers from the control loop, which are relatively slow compared to these comparator-based control loops. A constant on-time controller represents one implementation of ripple-mode control. With constant on-time, controllers, a switching controller generates turn-on pulses of a fixed width at a frequency determined by changing load conditions, and possibly changing input or output voltages.

SUMMARY OF THE INVENTION

The present invention provides an apparatus and method for ripple-mode control of a multi-phase power supply circuit. A ripple-mode switching controller provides one or more features, including cross-phase blanking, active current sharing, out-of-bounds compensation, and virtual ripple generation. Cross-phase blanking permits the controller to preserve the desired phase relationship between switching pulses it provides to the multiple output phases, even when it generates overlapping switching pulses at maximum duty cycle operation. Active current sharing compliments ripple-mode control by allowing the controller to balance the amount of load current provided by the individual output phases, based on either trimming the width of switching pulses provided to one or more output phases, or based on trimming hysteretic control points. The controller may also include an out-of-bounds function to suppress switching pulses in over-voltage situations, and virtual ripple generation to enhance ripple-mode noise immunity.

Active current sharing may be adapted to both constant on-time and hysteretic implementations of the controller. With active current sharing, the controller typically designates one output phase as a master phase. The controller then adjusts its phase switching operations to balance the current carried by each remaining output phase with respect to the master phase. This prevents one output phase from carrying an unequal or excessive share of output load current. For constant on-time operation, the controller trims the width of switching pulses provided to each of the slave output phases based on the relative amount of load current carried by each slave output phase. For hysteretic control, the controller increases or decreases the upper and lower hysteretic switching points for one or more of the slave output phases to achieve the desired current balance.

Pulse trimming or hysteretic adjustment concepts may be extended to include compensation for changes in supply or output voltages such that the controller's switching pulses are compensated for changing conditions. For example, in constant on-time applications, the controller can be configured to adjust switching pulse on-time to maintain essentially the same steady-state switching frequency over a range of supply voltages. Likewise, the controller could compensate switching pulse width to maintain steady state switching frequency for a range of selectable output voltages.

Further extending its flexibility, the controller may incorporate virtual ripple generation. A feedback signal taken from the controller's regulated output includes both actual ESR-induced output ripple, as well as the actual DC offset value of the regulated output voltage. Virtual ripple generation adds a desired amount of arbitrary ripple to this feedback signal to increase the noise immunity of ripple-mode regulation. Because the arbitrary ripple simply adds to the actual feedback signal, rather than replacing it, the controller preserves its transient response by maintaining its sensitivity to the actual DC and AC components of the regulated output voltage.

DETAILED DESCRIPTION OF THE INVENTION

Figure 1:
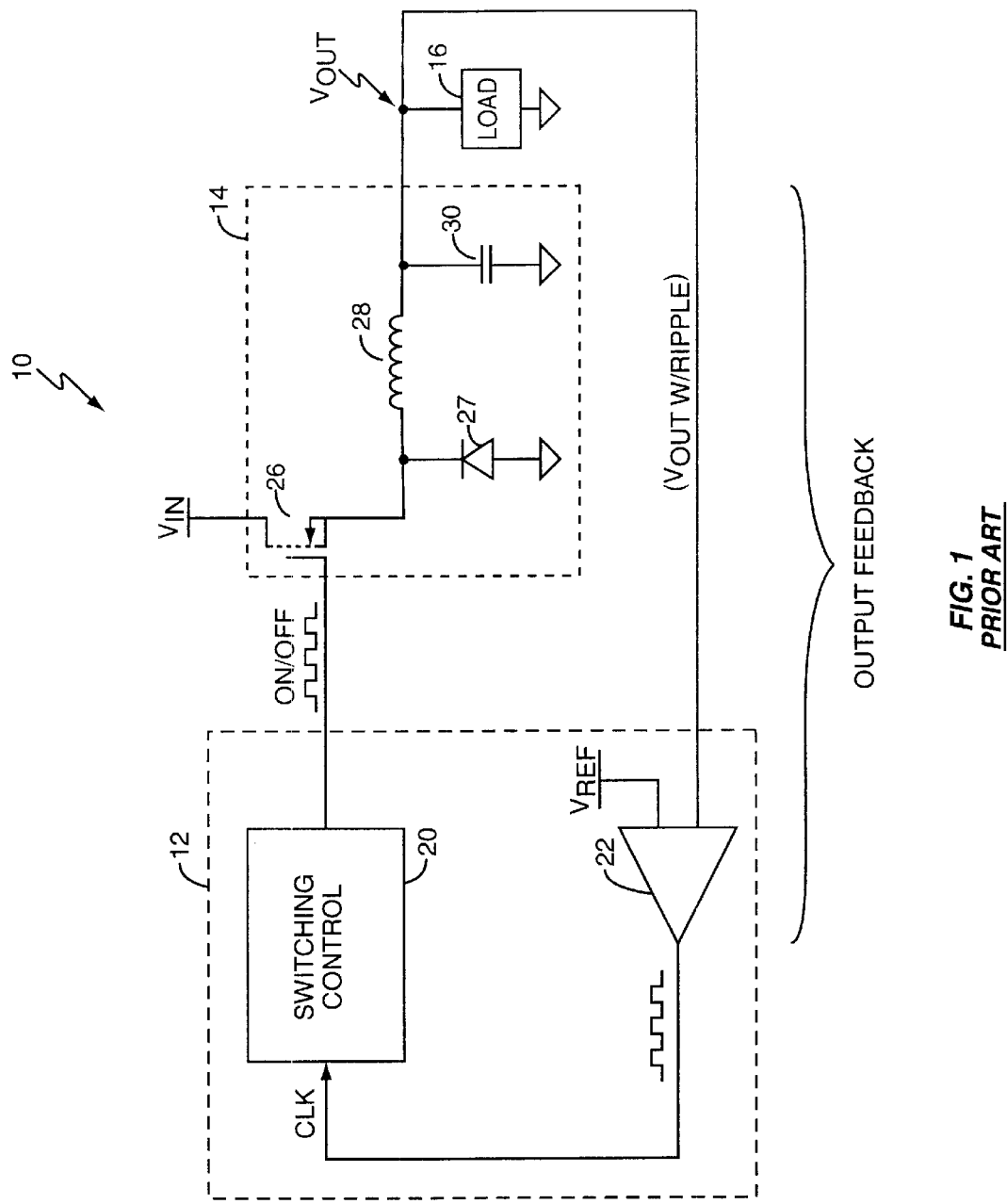
FIG. 1 is a diagram of a typical switch-mode power supply circuit.

FIG. 1 illustrates a typical electrical system 10 that includes a switch-mode power supply controller 12, a switching circuit 14, and a load 16. The controller 12 controls switching of the switching circuit 14 to effect voltage regulation of the output voltage $V_{OUT}$. The controller includes switching control logic 20 and a comparator 22. The output circuit 14 includes a switch 26, which may be a field-effect-transistor (FET), a catch diode 27, an inductor 28, and an output capacitor 30.

The controller 12 monitors the output voltage $V_{OUT}$ using the comparator 22 and generates switching signals that turn the switch 26 on and off to regulate the output voltage $V_{OUT}$. The general operations of such switch-mode power supply circuits is well understood, and will not be discussed in detail.

Several techniques exist for monitoring the output signal being regulated by the controller 12, in this case $V_{OUT}$, and include voltage-mode and current-mode feedback. A broad class of controllers 12 regulate the output signal by generating a switching clock driven by the switching ripple in $V_{OUT}$. The switching ripple arises from switching the switch 26 on and off to effect output voltage regulation.

Figure 2A:
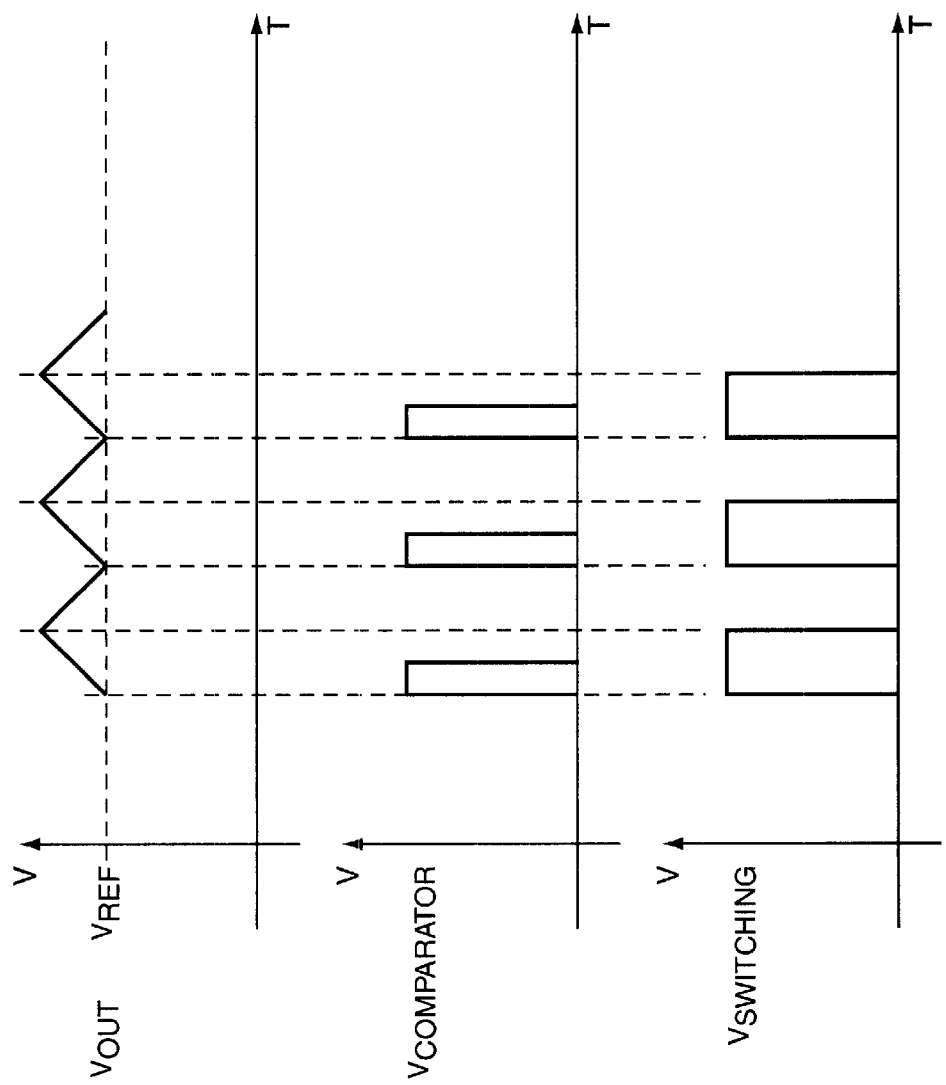
FIG. 2A is diagram of relevant waveforms associated with the power supply circuit of FIG. 1.

FIG. 2A illustrates one way in which so-called ripple mode regulation may be implemented with the controller 12. Nominally, $V_{OUT}$ is maintained at a reference voltage $V_{REF}$. The output voltage $V_{OUT}$ rises when the switch 26 is closed and falls when the switch 26 is open. Thus $V_{OUT}$ includes a DC component nominally at the desired voltage, with an AC ripple impressed onto this DC value. By configuring the comparator 22 to change states when $V_{OUT}$ crosses through a comparison threshold, in this case $V_{REF}$, the comparator produces clock pulses as a function of the ripple on $V_{OUT}$. Thus, the output of the comparator 22 transitions to high when $V_{OUT}$ crosses through $V_{REF}$, and the switch and control logic 20 turns on the output switch 26, which causes $V_{OUT}$ to begin to rise. This rising $V_{OUT}$ causes the output of the comparator 22 to again change states. In short, the controller 12 effects output regulation of $V_{OUT}$ by switching the switch 26 in the output circuit 14 on and off in response to clock signals generated by the ripple on the output voltage $V_{OUT}$.

Figure 2B:
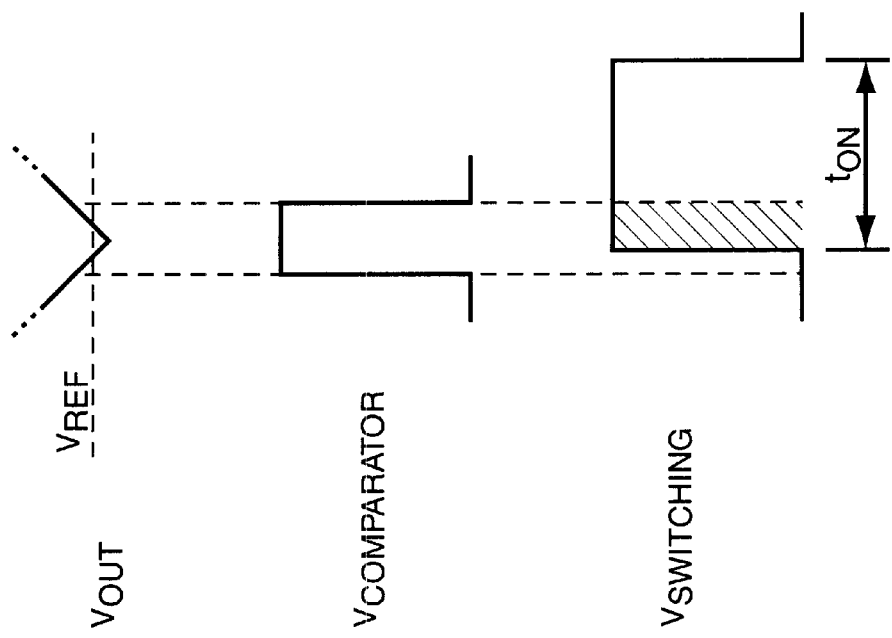
FIG. 2B is a diagram of waveform details from FIG. 2.

FIG. 2B presents a view of the waveform shown in FIG. 2A, but over a much smaller instant of time. $V_{OUT}$ is shown crossing though the comparison threshold, $V_{REF}$, which causes the comparator output $V_{COMPARATOR}$ to transition high. With minimal delay, the controller 12 causes its switching output signal $V_{SWITCHING}$ to transition high in response to $V_{COMPARATOR}$ transitioning high. Because $V_{OUT}$ does not respond immediately to the closing of the switch 26, $V_{COMPARATOR}$ does not immediately drop low when the output switch 26 is turned on. For a brief period of time, $V_{COMPARATOR}$ and $V_{SWITCHING}$ signals are both high. Once $V_{OUT}$ transitions back above $V_{REF}$, the comparator output drops low. Note that the $V_{SWITCHING}$ signal shown in FIG. 2B is representative of a mode of switching control referred to as constant on-time. That is, the controller 12 emits turn on pulses to the switch 26 of a fixed width, varying the frequency of the pulses to control the level of $V_{OUT}$.

Figure 3:
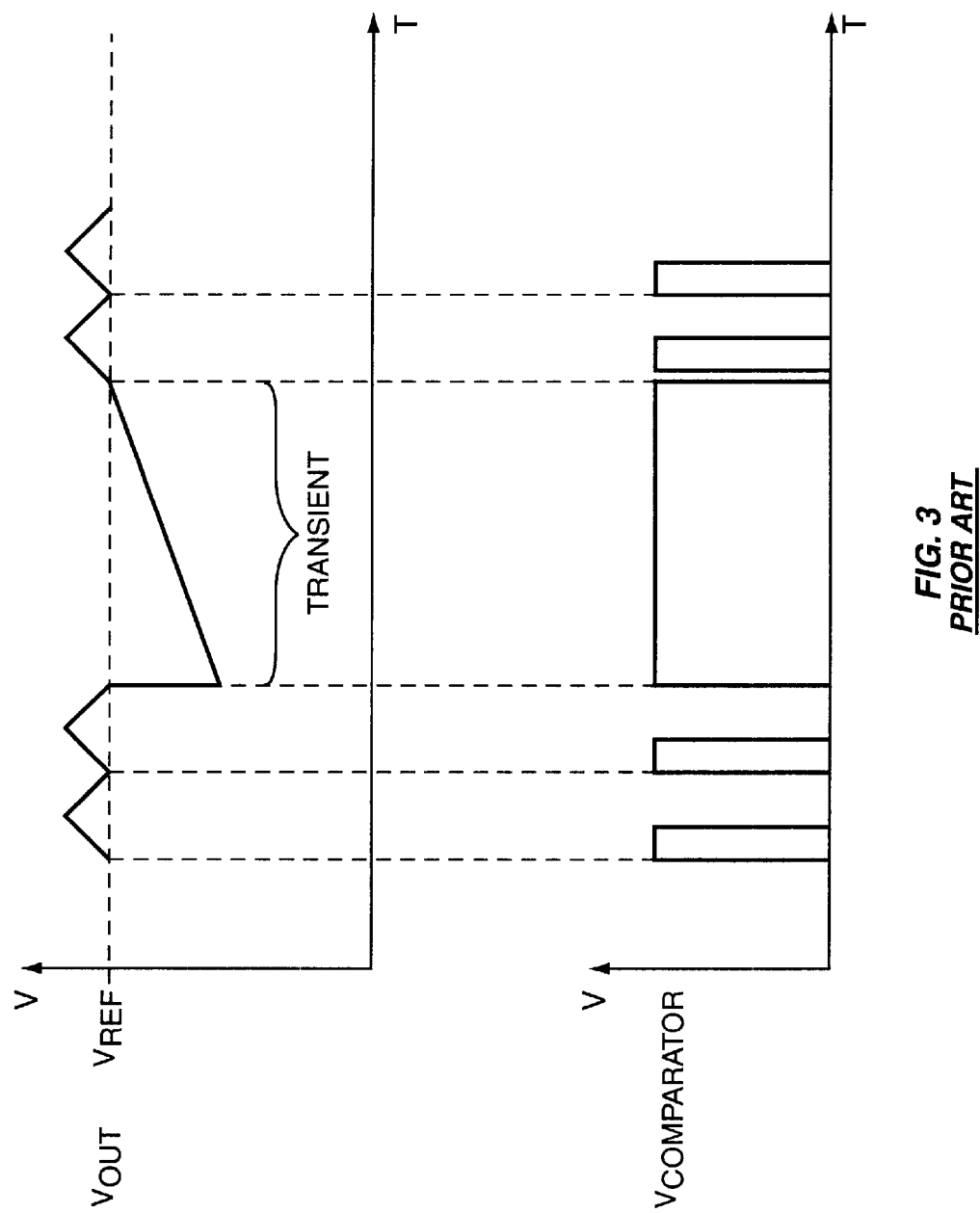
FIG. 3 is a diagram of transient operation of the power supply circuit of FIG. 1.

FIG. 3 illustrates a problematic condition for typical ripple-mode controllers 12. A sudden increase in current at the load 16 can pull the output voltage $V_{OUT}$ well below the comparison threshold for a sustained period of time. Once the output voltage is a sufficient level below the comparison threshold voltage, the ripple signal no longer causes the output voltage to transition back and forth through the comparator's trip point. This causes the output from the comparator 22 to become static during the transient excursion. With static output from the comparator 22, the switching control logic 20 no longer receives a switch-clocking signal and thus ceases clocking the output switch 26 on and off.

Figure 4:
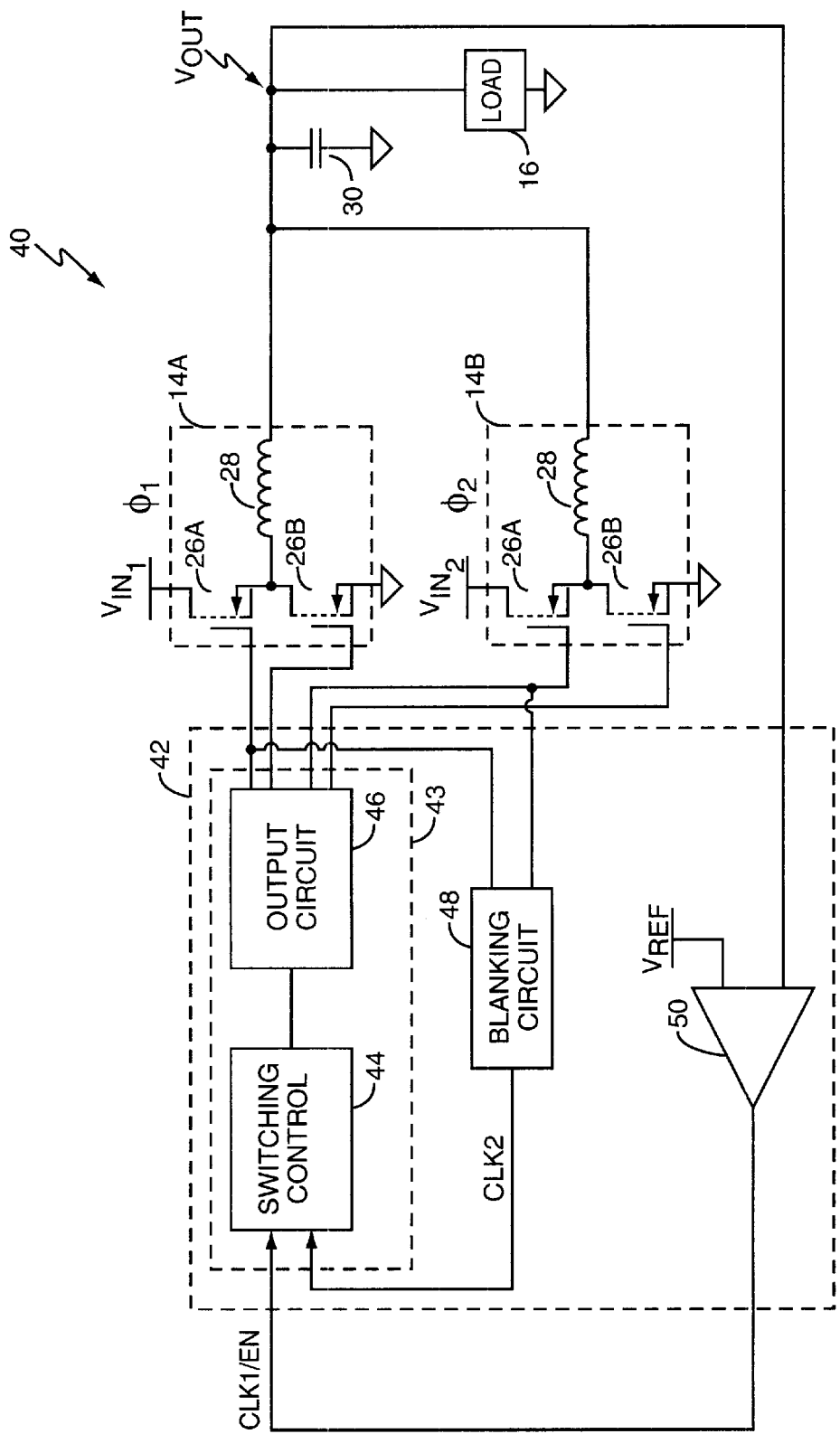
FIG. 4 is a diagram of a dual-phase power supply circuit according to the present invention.

FIG. 4 depicts an electrical circuit 40 in accordance with a two-phase implementation of the present invention. The circuit 40 includes a switching controller 42, phase 1 ($\phi_1$) and phase 2 ($\phi_2$) switching circuits 14A and 14B, an output capacitor 30, and a load 16. The controller 42 coordinates control of the switching circuits 14 to provide a regulated output voltage $V_{OUT}$ at the load 16. Note that the switching circuits 14A and 14B may operate from different supply voltages, $V_{IN2}$, and $V_{IN2}$, for added flexibility.

The switching controller 42 includes a control circuit 43 comprising control logic 44 and an output circuit 46. The controller 42 further comprises a blanking circuit 48, and a regulation comparator 50. The switching circuits 14A and 14B are shown configured for synchronous buck conversion, but may be configured for a variety of step-up and step-down voltage conversion functions. Each exemplary switching circuit 14A includes a high-side switch 26A, a low-side switch 26B, and an inductor 28. The switches 26A and 26B are typically field-effect transistor (FET) switches.

To switch o1 high, the controller 42 turns on the high-side switch 26A in the switching circuit 14A and turns off the low-side switch 26B. To switch +1 low, the controller 42 performs the converse, switching the high-side switch 26A off and the low-side switch 26B on. By alternately switching the two output switching circuits 14A and 14B high and low, the controller 42 maintains a regulated output voltage $V_{OUT}$ at the load 16. The switching action of the controller 42 causes the current through the inductors 28 to ramp up and down, and these ramping currents generate a ripple voltage through the output capacitor 30, due to its equivalent series resistance (ESR). The regulation comparator 50 in the controller 42 uses this ripple component of the output voltage $V_{OUT}$ to maintain steady-state regulation.

The regulation comparator 50 compares the feedback signal taken from the regulated output voltage $V_{OUT}$ to a DC voltage level $V_{REF}$, that represents the desired value of the output voltage $V_{OUT}$, or some fraction or multiple thereof. As the value of $V_{OUT}$ falls, it crosses the $V_{REF}$ comparison point and the regulation comparator changes its output state, causing the control circuit 43 to switch one of the two switching circuits 14 high. This causes $V_{OUT}$ to rise back above the $V_{REF}$ comparison point, which causes the regulation comparator to again change its output state. The above action causes the regulation comparator 50 to provide the switching control circuit 44 with a series of pulses during steady-state regulation of $V_{OUT}$.

In a constant on-time implementation, the output circuit generates alternating fixed-width turn-on pulses for the switching circuits 14A and 14B in response to the clock pulses from the regulation comparator. The blanking circuit 48, which is described in more detail later, provides cross-phase blanking and allows the controller 42 to maintain the desired phase relationship between switching pulses provided to the switching circuits 14A and 14B, even under high duty cycle conditions. Nominally, the regulation comparator 50 provides a clock pulse to the switching circuit 43 based on ripple in $V_{OUT}$. In turn, the switching circuit 43 causes the output circuit to provide a fixed-width switching pulse to one of the switching circuits 14A or 14B. $V_{OUT}$ rises during the on-time of the switching pulse, and then begins falling again. The process repeats with the other one of the switching circuits 14 being switched on, and so on.

In some circumstances, such as a step change increase in load current into the load 16, $V_{OUT}$ may drop below the regulation comparison point for an extended period, causing the regulation comparator 50 to stop its output clocking. The blanking circuit 48 allows the controller 42 to continue switching the output switching circuits 14A and 14B with the desired phase relationship under these conditions, even at near 100% duty cycles. It accomplishes this by feeding back φ1 and φ2 switching pulses with a defined delay to continue clocking the switching controller 44. This allows the controller 42 to generate $\phi_1$ and $\phi_2$ switching pulses that overlap in time, if output loading conditions require such high duty cycles. The control logic 44 is typically configured so that it responds to feedback clocking from the blanking circuit 48, only when the output level from the regulation comparator 50 indicates that $V_{OUT}$ is below the desired voltage level. The blanking circuit 48 is discussed in more detail later.

An additional advantage provided by the blanking circuit 48 is that its feedback blanking delay establishes a maximum switching frequency for the controller 42. That is, the blanking delay establishes the minimum time difference between turn-on pulse rising edges from phase-to-phase. Thus, miscellaneous supporting circuitry (not shown) within the controller 42 that require some form of clocking, may be designed with this well defined upper operating frequency in mind.

Figure 5:
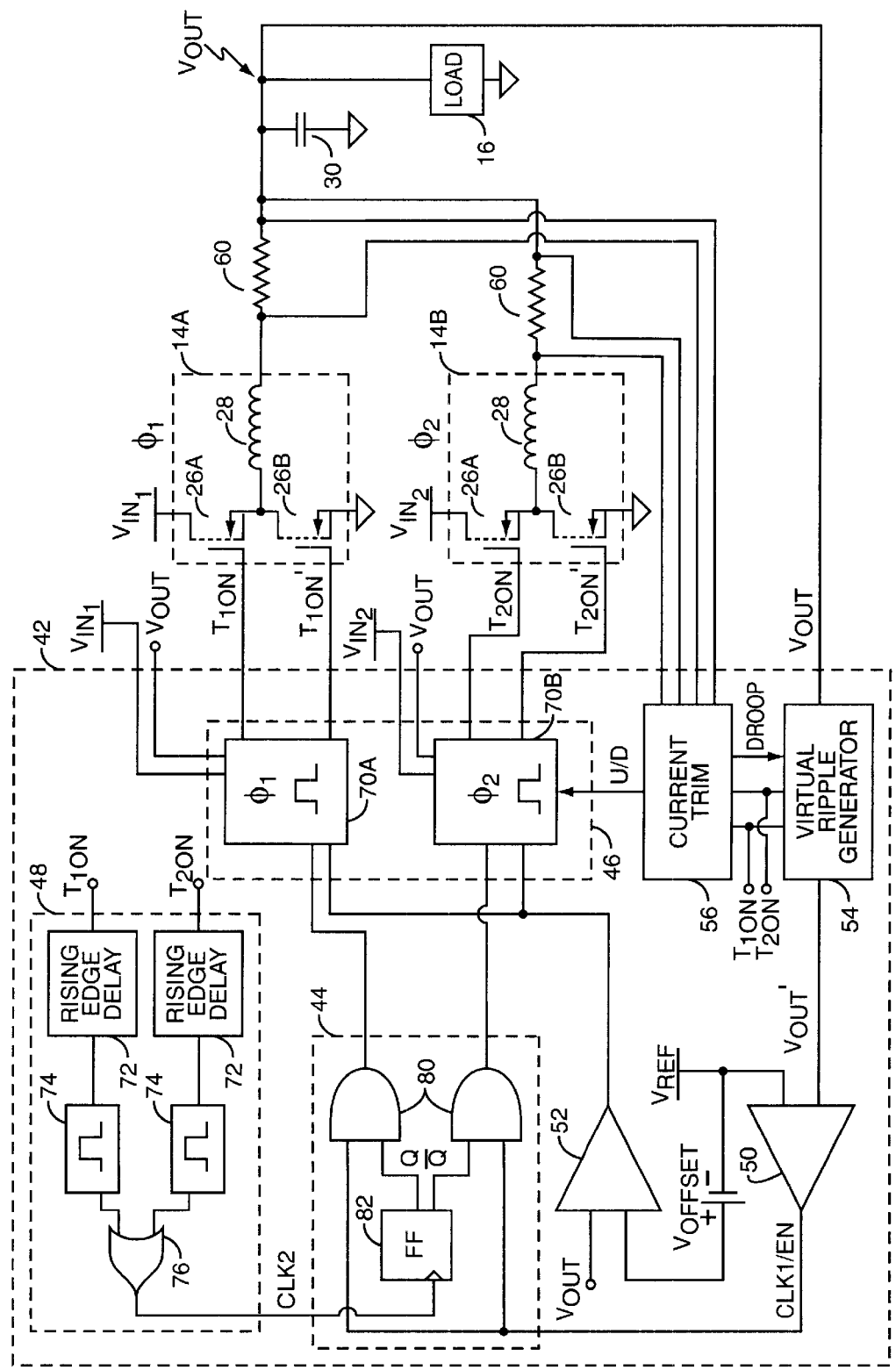
FIG. 5 is a diagram of an exemplary embodiment of the power supply of FIG. 4.

FIG. 5 is a diagram of exemplary details for the circuit 40 of FIG. 4. FIG. 5 expands on the features illustrated in FIG. 4 by adding an out-of-bounds comparator 52, a virtual ripple generator 54, and a current trim circuit 56. The out-of-bounds comparator 52 prevents the controller 42 from exacerbating over-voltage conditions on $V_{OUT}$, while the virtual ripple generator 56 provides the controller 42 with enhanced noise immunity. The current trim circuit 56 supports active current sharing, which the controller 42 may implement to ensure that no one switching circuit 14 carries an excessive share of load current. These and other features of the controller 42 are explained below.

Operation of the controller 42 described above may be better understood in this exemplary two-phase implementation of the controller 42 by beginning with the control circuit 43. The primary clock provided by the regulation comparator 50 serves as an input to the control logic 44, which comprises two AND gates 80. The AND gates each drive one of the pulse generation circuits 70A and 70B of the controller output circuit 46. A flip-flop 82 serves as a toggle circuit alternately providing a high and low signal to the two AND gates 80. By generating switching signals for the switching circuits 14 as a series of switching pulses of a determined pulse width, the switching controller 42 operates as a constant on-time controller.

At any given time, only one of the AND gates 80 receives a high signal from the flip-flop 82. Thus, at a given point in time, only one of the AND gates 80 is enabled to pass the primary clock signal from the regulation comparator 50. Assuming that the "Q" output from the flip-flop 82 is high, the AND gate corresponding to the pulse generation circuit 70A is enabled. When the primary clock from the regulation comparator 50 transitions high, this upper AND gate 80 provides a pulse initiation signal to the pulse generation circuit 70A. In turn, the pulse generation circuit 70A asserts the output switching pulse $T_{1ON}$ high, which turns on the o1 switching circuit 14A.

The $T_{1ON}$ pulse is fed back through the corresponding rising edge delay circuit 72 of the blanking circuit 48. The amount of the delay imparted by the rising edge delay circuit 72 is sufficient such that the one shot 74 does not cause a clock transition in the secondary clock provided by the logic gate 76 before the regulation comparator 50 changes states in response to the switching circuit 14A being turned on. After this blanking delay, the one-shot 74 generates a clean output pulse, which the logic gate 76 provides to the flip-flop 82. The pulse causes the flip-flop 82 to change states and thereby enable the lower AND gate 80, such that the next high going pulse in the primary clock from the regulation comparator 50 will initiate an output pulse from the pulse generation circuit 70B to turn on the $\phi_2$ switching circuit 14B. Under nominal steady-state conditions this process repeats, alternately initiating the pulse generation circuits 70A and 70B.

Certain types of load transients, such as a sudden reduction in load current, cause the output voltage $V_{OUT}$ to rise suddenly. Because either pulse generation circuit 70A or 70B could begin generating an output pulse of a predetermined pulse width just as the output voltage $V_{OUT}$ begins rising above the desired regulation value, the controller 42 could exacerbate the overshoot condition.

To suppress this behavior, the controller 42 can include the out-of-bounds comparator 52. A small amount of voltage, $V_{OFFSET}$, is added to the reference voltage $V_{REF}$. The resulting voltage is used as the comparison threshold for the out-of-bounds comparator 52. When $V_{OUT}$ moves above $V_{REF}+V_{OFFSET}$, the out-of-bounds comparator 52 asserts a disable signal. The disable signal causes the pulse generation circuits 70A and 70B to immediately cut short or suppress their output pulses. In this manner, the out-of-bounds comparator 52 prevents the controller output circuit 46 from turning on the output circuits 14 when the output voltage $V_{OUT}$ is at or above the out-of-bounds threshold.

Other types of load transients, such as a step change increase in load current into the load 16, may cause $V_{OUT}$ to suddenly drop below $V_{REF}$. This causes the CLK1/EN signal from the regulation comparator 50 to assume a static enable state (e.g., a logic high state). In this condition, the Q and *Q (inverse) outputs from the flip-flop 82 determine which AND gate 80 is enabled.

Assuming that the Q output was high when the CLK1/EN signal went high, the control logic 44 provides a pulse initiation signal to the pulse generation circuit 70A, causing it to output a switching pulse ($T_{1ON}$) for the $\phi_1$ output phase. The corresponding delay circuit 72 in the blanking circuit 48 delays this switching pulse before passing it to the associated one-shot 74. The one-shot 74 provides the logic gate 76 with a clean pulse, which the logic gate 76 outputs to the flip-flop 82 of the control logic 44. This causes the flip-flop 82 to transition its Q output from high to low, and its *Q output from low to high. This action causes the upper AND gate 80 to de-assert its output, and the lower AND gate 80 to assert its output, assuming the CLK1/EN signal is still high from the regulation comparator 50. Thus, the lower AND gate 80 provides the pulse generation circuit 70B with a pulse initiation signal, causing it to generate a switching pulse ($T_{2ON}$) for the $\phi_2$ output phase. The blanking circuit 48 feeds this pulse back and the process repeats alternating between $\phi_1$ and $\phi_2$ while the CLK1/EN signal remains in its static enable condition.

Note that the cross-blanking- function of the blanking circuit 48 described above uses the switching pulse from one output phase to initiate the switching pulse for the next phase. By applying its feedback delay, the blanking circuit 48 establishes a minimum delay between respective $\phi_1$ and $\phi_2$ switching pulses, and maintains the desired phase relationship between the switching pulses provided to the output phases. Thus, in the two-phase example, the blanking circuit 48 permits the controller 42 to generate the switching pulses provided to the switching circuits 14A and 14B with the desired 180° of phase separation over the full range of pulse duty cycles.

As noted above, the virtual ripple generator 54 provides the controller 42 with increased noise immunity. It does so by adding an arbitrary magnitude ripple component to the feedback signal taken from $V_{OUT}$. The added ripple is synchronized to the actual switching pulses of the controller 42 and simply adds to whatever actual ESR-induced ripple is actually present in the regulation feedback signal. The added ripple increases the magnitude of the ripple used for regulation, thereby improving noise immunity.

Because the generated ripple component added by the virtual ripple generator does not interfere with the DC component of the $V_{OUT}$ feedback signal, the virtual ripple generator 54 does not compromise the transient response of the controller 42 with respect to step changes in the load 16. Also, because the generated ripple component does not depend on or require the presence of actual ESR-induced ripple in the output feedback signal taken from $V_{OUT}$, the controller 42 with the virtual ripple generator 54 can operate stably and reliably even when the output capacitor 30 is an ultra-low ESR type capacitor that provides little, if any, actual ripple.

In more detail, the regulation comparator 50 provides the primary clocking signal to the control logic 44. The primary clocking signal results from comparing the output voltage $V_{OUT}$, including its output ripple component, to a reference voltage $V_{REF}$, which represents the desired value for $V_{OUT}$. The ripple component of $V_{OUT}$ varies significantly with a number of parameters, including the ESR of the output capacitor 30 and the magnitude of the ripple current induced by switching the switching circuits 14 on and off to generate the voltage $V_{OUT}$. Thus, creating the primary clocking signal for the control logic 44 from the ripple component in the output voltage $V_{OUT}$ can be problematic. The primary clock is left vulnerable to disruptions due to load transients and spurious noise coupled onto the $V_{OUT}$ voltage feedback.

The virtual ripple generator 54 buffers $V_{OUT}$ to create $V'_{OUT}$, that includes an offset portion responsive to the regulated output voltage $V_{OUT}$, and an artificially generated ripple signal with an arbitrary magnitude that is synchronized to the switching actions of the controller 42.

The arbitrary ripple signal may be maintained essentially free of noise, and is independent of the actual DC and AC components of $V_{OUT}$, thus providing a more robust ripple signal for use by the regulation comparator 50. The co-pending application, filed concurrently with the instant application, and entitled "Virtual Ripple Generation," explains operation of the virtual ripple generator 54 and is incorporated by reference herein.

Figure 6:
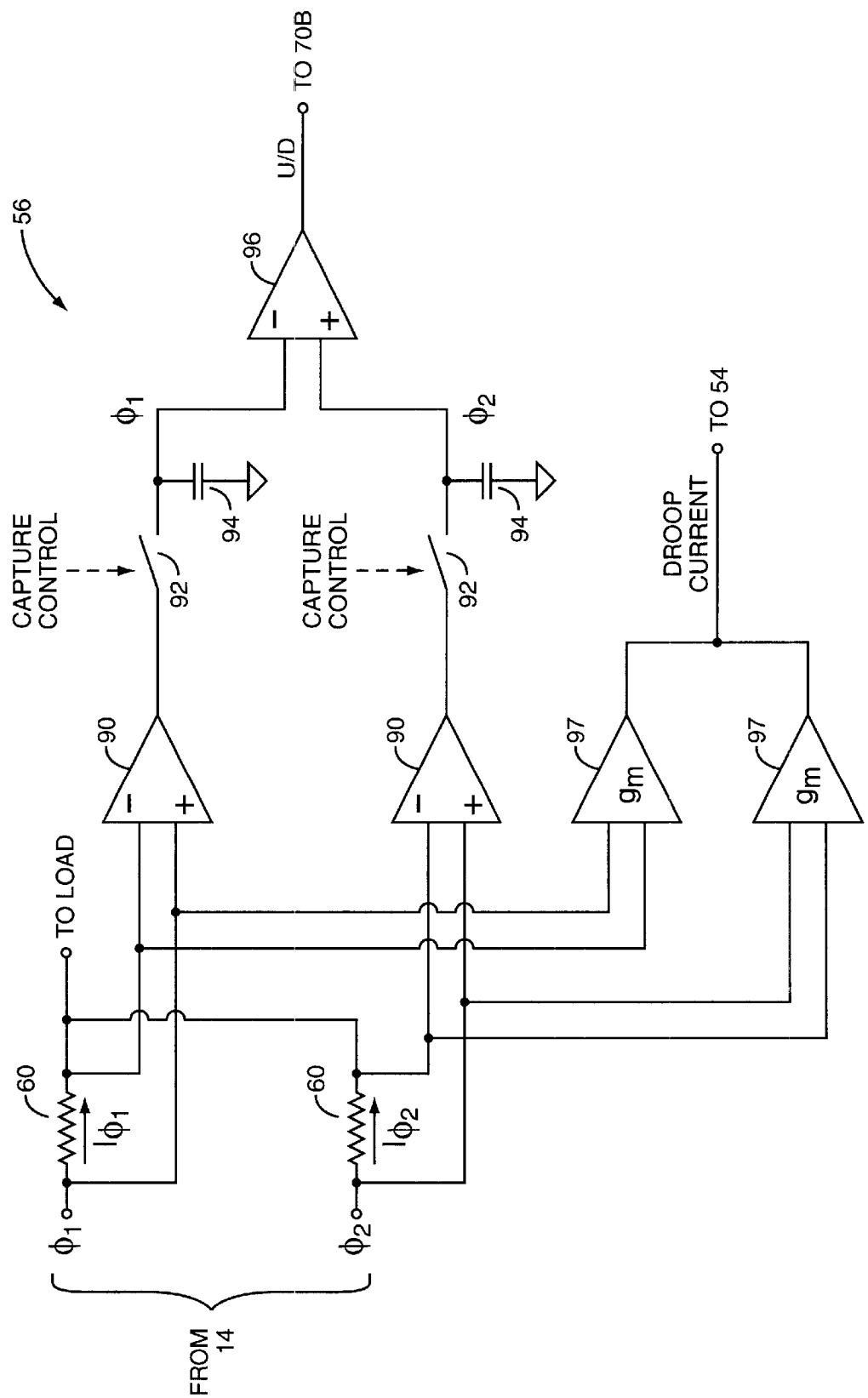
FIG. 6 is a diagram of the current trim circuit of FIG. 5.

FIG. 6 is a diagram of an exemplary current trim circuit 56, and provides a basis for discussing active current sharing in more detail. The current trim circuit 56 includes differential amplifiers 90, sample-and-hold circuits comprising switches 92 and capacitors 94, and a comparator 96. The current trim circuit 56 optionally includes transconductance amplifiers 97 for $\phi_2$ and $\phi_2$ to implement regulated output voltage droop.

In multi-phase applications, variations in circuit elements and layout specifics cause current sharing between output phases 14 to deviate from this ideal scenario. Certain output phases can carry significantly more or less current than the other output phases. Asymmetrical current sharing can cause inefficiency, increased noise on the load 16, and even component failures within the switching circuits 14. Pulse width trimming insures that the multiple output phases share current equally.

In its two-phase implementation, the controller 42 alternately turns the output phases 14A and 14B on and off 180° out of phase with respect to each other to generate the regulated output voltage $V_{OUT}$. To switch $\phi_1$ high (on), the controller 42 pulses the signal line $T_{1ON}$ high, while pulsing the signal line $T'_{1ON}$ low. Switch control assures that switches 26A and 26B are not simultaneously enabled. To switch $\phi_1$ low (off), $T_{1ON}$ drops low, and $T'_{1ON}$ drives high. In a given implementation, the particular signal lines necessary to turn a given output phase 14 on and off are determined both in number and in polarity by the particular configuration of the output phases 14A and 14B and by the implementation of the controller 42.

With active current sharing, the controller 42 balances the load current between the output phases. In the two-phase example of FIG. 5, the two output phases are the two switching circuits 14A and 14B, but the concept directly extends to any number of output phases. One output phase is designated a "master" phase, with the remaining phases designated as slave phases. The controller 42 adjusts the currents in the slave output phases based on the current in the master output phase. In this two-phase example, the switching circuit 14A is the master phase, and the switching circuit 14B is the slave phase.

The controller 42 senses the currents in the switching circuits 14A and 14B via the current trim circuit 56. Based on the relative value of the phase currents, the current trim circuit 56 controls the pulse generation circuit 70B to increase or decrease the pulse width of the switching pulses provided to the switching circuit 14B so that its current matches that of the switching circuit 14A. Exemplary details for the pulse generation circuits 70A and 70B appear later.

In operation, the amplifiers 90 amplify the voltage drops across the +i and ¢2 sense resistors 60. Because the $\phi_1$ and $\phi_2$ currents are ideally 180° out of phase, the capture circuits comprising switches 92 and holding capacitors 94 are used so that the value of the currents in $\phi_1$ and $\phi_2$ may be compared using the comparator 96. The switching signals provided by the controller output circuit 46 may be used as capture control signals so that $\phi_1$ and $\phi_2$ currents are compared at the same relative phase time.

The comparator 96 generates an up/down signal based on whether the magnitude of current in $\phi_2$ is greater or less than the magnitude of the current in $\phi_1$. The up/down signal drives the current-based pulse width trimming implemented by the pulse generation circuit 70B. Such pulse width trimming adjusts the $\phi_2$ current to make it substantially equal to the $\phi_1$ current.

The current trim circuit 56 optionally includes transconductance amplifiers 97 which produce a droop current proportional to the voltage drop across the sense resistors in $\phi_1$ and $\phi_2$. The droop current signal is provided to the virtual ripple generator 54, which uses the droop current to offset the V'$_{OUT}$ provided to the regulation comparator 50. This allows the controller 42 to lower by a slight amount the regulated value of the output voltage V$_{OUT}$ under-heavy load current conditions, such that voltage over-shoot is minimized when current into the load 16 suddenly decreases.

Figure 7A:
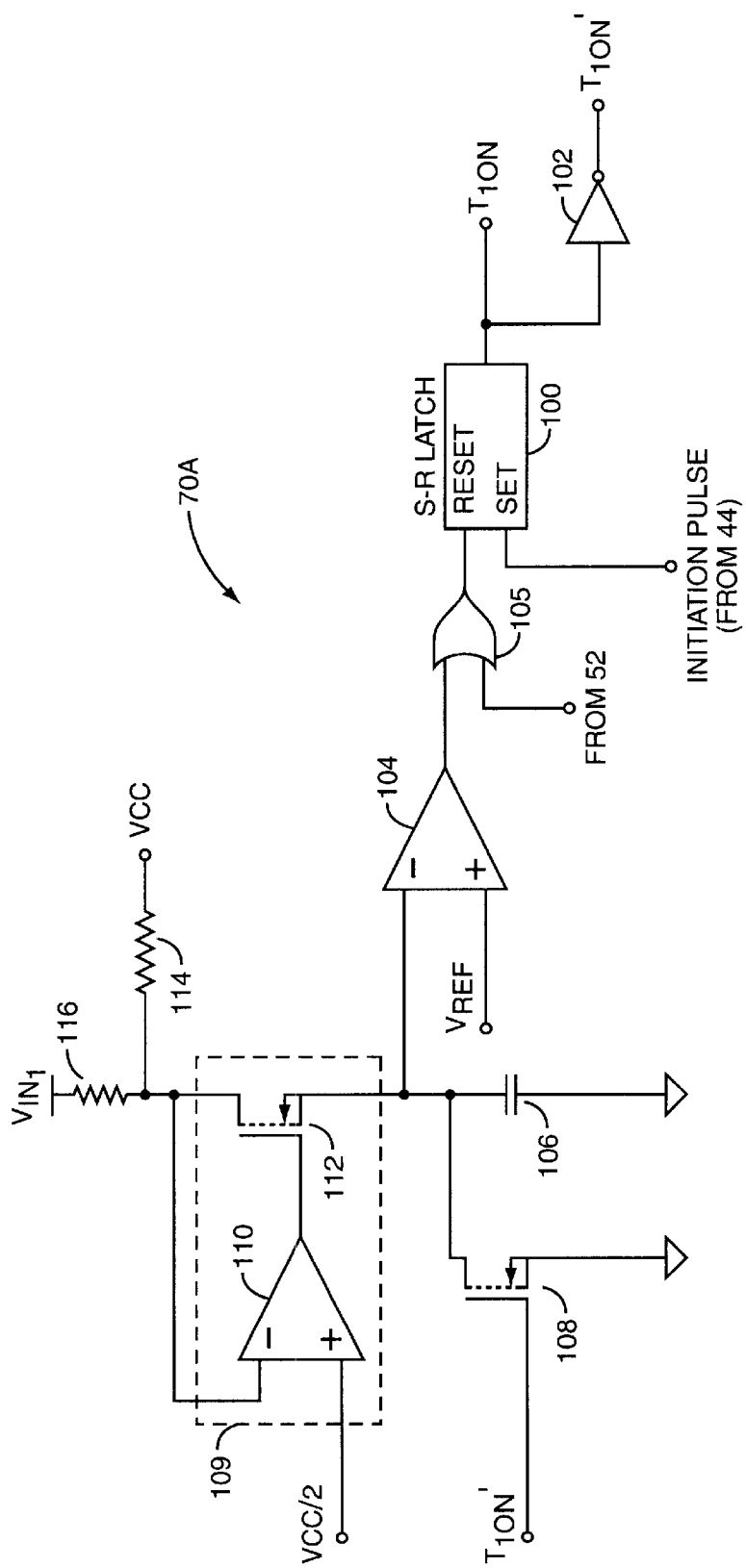
FIG. 7A is a diagram of the constant on-time pulse generation circuit of FIG. 5.

FIG. 7A is a diagram of the pulse generation circuit 70A. More generally, it is a diagram of a pulse generation circuit for use with a master output phase. The pulse generation circuit 70A comprises a set-reset latch 100, an inverter 1φ2, a comparator 104, a capacitor 106, a first FET 108, a slope adjustment circuit 109, including an amplifier 110 and a second FET 112, and a resistor divider network including resistors 114 and 116.

The pulse generation circuit 70A functions as a constant on-time pulse generation circuit. It provides switching pulses to the switching circuit 14A having a fixed pulse width in response to pulse initiation signals from the control logic 44. By including provisions for compensating its switching pulse width as a function of the supply voltage V$_{IN1}$, and the desired value of V$_{OUT}$, the pulse generation circuit 70A provides an essentially constant switching frequency under steady state load conditions for a range of input and output voltages.

In operation, the pulse generation circuit 70A asserts the output from the set-reset latch 100 and begins generating a ramp signal when it receives a pulse initiation signal from the control logic 44. The slope of the ramp signal is set, in part, by the supply voltage V$_{IN1}$. The ramp signal is compared to a comparison threshold voltage, V$_{REF}$ in this case, that is a function of the desired output voltage. When the ramping signal reaches the comparison threshold, the set-reset latch 100 is reset, thus de-asserting its output signal and thereby completing an output switching pulse. Thus, the switching pulse width is a function of the ramp slope and the comparison threshold.

In more detail, the control logic 44 generates an initiation pulse to set the set-reset latch 100. The set-reset latch 100 provides the output pulse T$_{1ON}$ used to turn on and off the corresponding $\phi_1$ switching circuit 14. The inverter 1φ2 generates the T'$_{1ON}$ as the logical opposite of T$_1$,ON The comparator 104 resets the set-reset latch 100 when a voltage across the capacitor 106 exceeds the reference voltage V$_{REF}$, which represents the desired output voltage. The FET 108 operates as a switch and controls whether or not the capacitor 106 charges.

When the set-reset latch 100 asserts the output pulse T$_{1ON}$, the T'$_{1ON}$ signal transitions from high to low, turning the FET 108 off, allowing the capacitor 106 to begin charging. The amplifier 108 controls the pass transistor 110 to set the charging current into the capacitor 106, based on a feedback value determined in part by the supply voltage V$_{IN1}$. A regulated voltage V$_{CC}$ that is independent of the desired output voltage level V$_{REF}$ feed through series resistor 112 into a node that forms a voltage divider with the supply voltage V$_{IN1}$ through series resistor 114. The amplifier 110 compares a fraction of the regulated voltage V$_{CC}$ with the voltage at the divider node between resistors 112 and 114, and controls pass transistor 110 as a function of that voltage.

In general, the amplifier 108, pass transistor 110, and series resistor 114 cooperate to generate a charging circuit that is proportional to the input voltage V$_{IN1}$. That is, the capacitor 106 charges at a faster rate as the supply voltage V$_{IN1}$ increases. This has the tendency to shorten the width of the output pulse T$_{1ON}$ because the voltage on the capacitor 106 reaches the comparison threshold of the comparator 104 sooner. Conversely, if the reference voltage V$_{REF}$ is increased, which has the effect of increasing the regulated output voltage V$_{OUT}$, the comparison threshold for the comparator 104 increases, which means that the capacitor 106 must charge for a longer period of time before the set-reset latch 100 is reset. This function has the net effect of stretching the output pulse T$_{1ON}$. Other circuit configurations may be used to create a charging current proportional to the input voltage V$_{IN1}$.

Figure 7B:
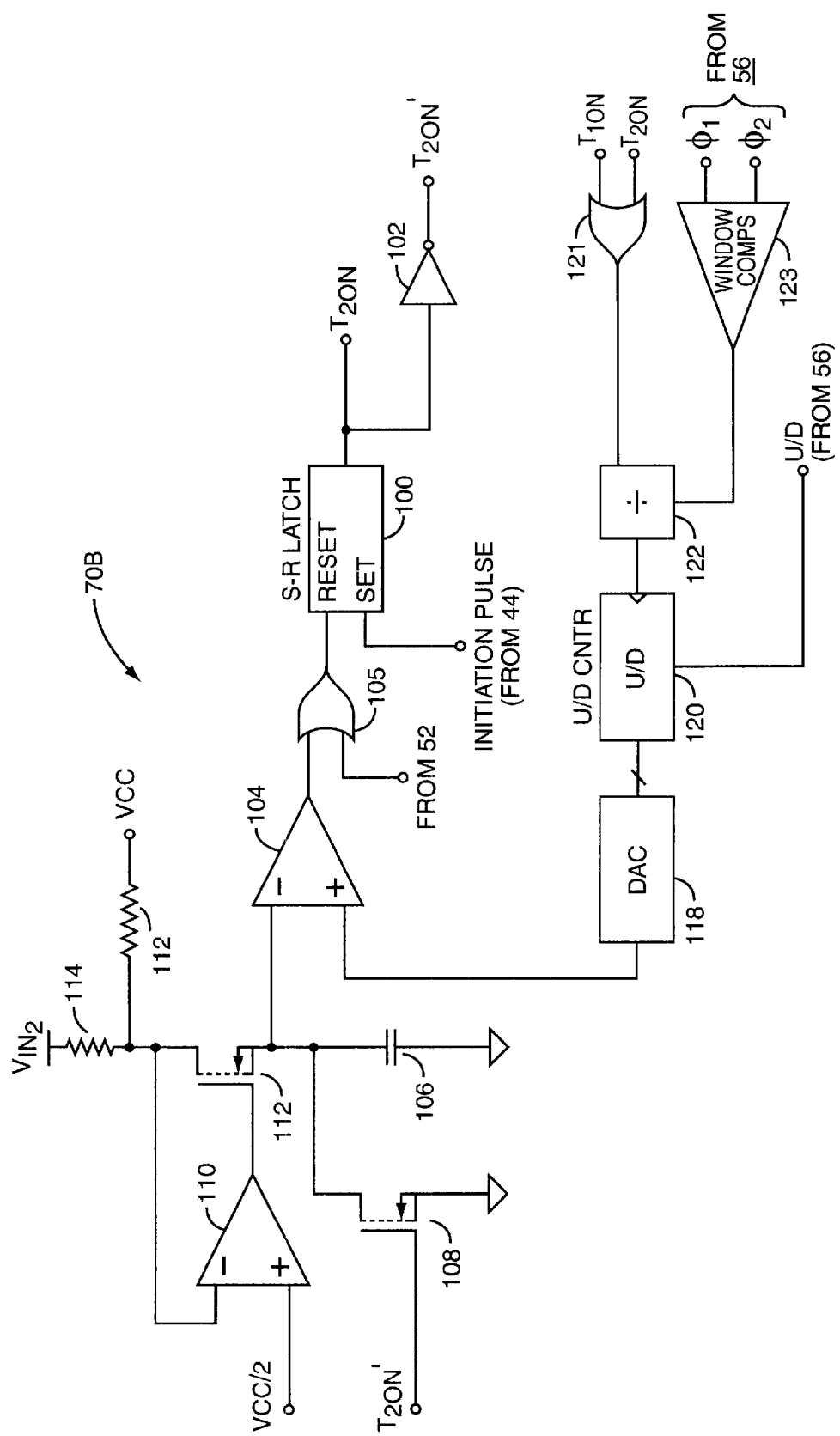
FIG. 7B is a diagram of the constant on-time pulse generation circuit with currenttrim features of FIG. 5.

FIG. 7B illustrates the pulse generation circuit 70B that generates the output pulses T$_{2ON}$, which turns on and off the switching circuit 14B. The pulse generation circuit 70B basically functions identically to the pulse generation circuit 70A, but includes additional elements that allow pulse width trimming in support of active current sharing. That is, the pulse generation circuit 70B responds to a current trim signal from the current trim circuit 56, allowing the controller 42 to adjust the $\phi_2$ current to substantially match that of $\phi_1$. Specifically, the pulse generation circuit 70B additionally includes a pulse adjustment circuit comprising a digital-to-analog converter 118, an up/down counter 120, a logic gate 121, a clock divider 122, and one or more window comparators 123.

The pulse generation circuit 70B nominally generates an output pulse T$_{2ON}$ having a width determined by the value of the supply voltage V$_{IN2}$ and an output voltage from a digital-to-analog converter (DAC) 118 that is nominally at the reference voltage V$_{REF}$. The value of the voltage output by the DAC is determined by the digital count value provided by the counter 120. The counter 120 is driven up or down in count value as needed to adjust the DAC output voltage to a value that yields the desired load current balance between the master output phase 14A and the slave output phase 14B.

The logic gate 121 generates a counter clocking signal by applying an OR function to the $T_{1ON}$ and $T_{2ON}$ switching pulses. The clock divider 122 operates as a divide-by-n divider, where the value of n is set by one or more signals provided by the window comparators 123.

The comparison reference voltage provided to the comparator 104 used to reset the set-reset latch 100 varies with the current imbalance detected by the current trim circuit 56. If the output current provided by the switching circuit 14 for $\phi_1$ exceeds that provided by the switching circuit 14 for $\phi_2$, the current trim circuit 56 controls the up/down signal so that the counter 120 counts down, thereby decreasing the voltage provided by the DAC 118. This has the net effect of reducing the width of the output pulse $T_{2ON}$. Conversely, if the switching circuit 14 for $\phi 2$ is carrying less current than that provided by the switching circuit 14 for $\phi_1$, the current trim circuit 56 controls the up/down signal such that the counter 120 increases its count value, thereby increasing the comparison reference voltage to the comparator 104. This has the net effect of increasing the width of the turn on pulse $T_{2ON}$. This type of trim control may be extended to multiple output phases 14.

The clock divider 122 operates with a variable divider value so that the bandwidth or responsiveness of the current trimming operation may be varied as a function of the magnitude of the difference between the associated output phase currents.

For example, the window comparators 123 can generate a first signal (b0) if the phase current difference is below a first threshold, a second signal (b1) if it is above the first threshold but below a second threshold, and a third signal (b2) if it is above the third threshold. For a binary value 000 (b2, b1, b0), the clock divider 122 might set n to a relatively high value, say 16. This reduces the bandwidth of the pulse adjustment circuit, which is appropriate for small current differences. Conversely, for a binary value of 111, the clock divider 122 might set n to a value of 1, which greatly increases the bandwidth of the pulse adjustment circuit. This action allows the counter value to change rapidly, which, in turn, causes the DAC output voltage to change rapidly. As the phase current error decreases, the clock divider 122 can select increasingly large divider values.

As earlier noted, the structure of the pulse generation circuits 70A and 70B allow different supply voltages ($V_{IN1}$ and $V_{IN2}$) to power the output phases 14A and 14B. The ability to operate with different supply voltages per output phase allows the controller 42 to generate on-time pulses for output phases 14A and 14B that have different pulse widths, based on the relative values of $V_{IN1}$ and $V_{IN2}$. This ability is useful in applications where a single supply voltage cannot support the required load current to load 16 under all operating conditions. Of course, $V_{IN1}$ and $V_{IN2}$ may be the same supply voltage if that is advantageous in a given application.

Figure 8:
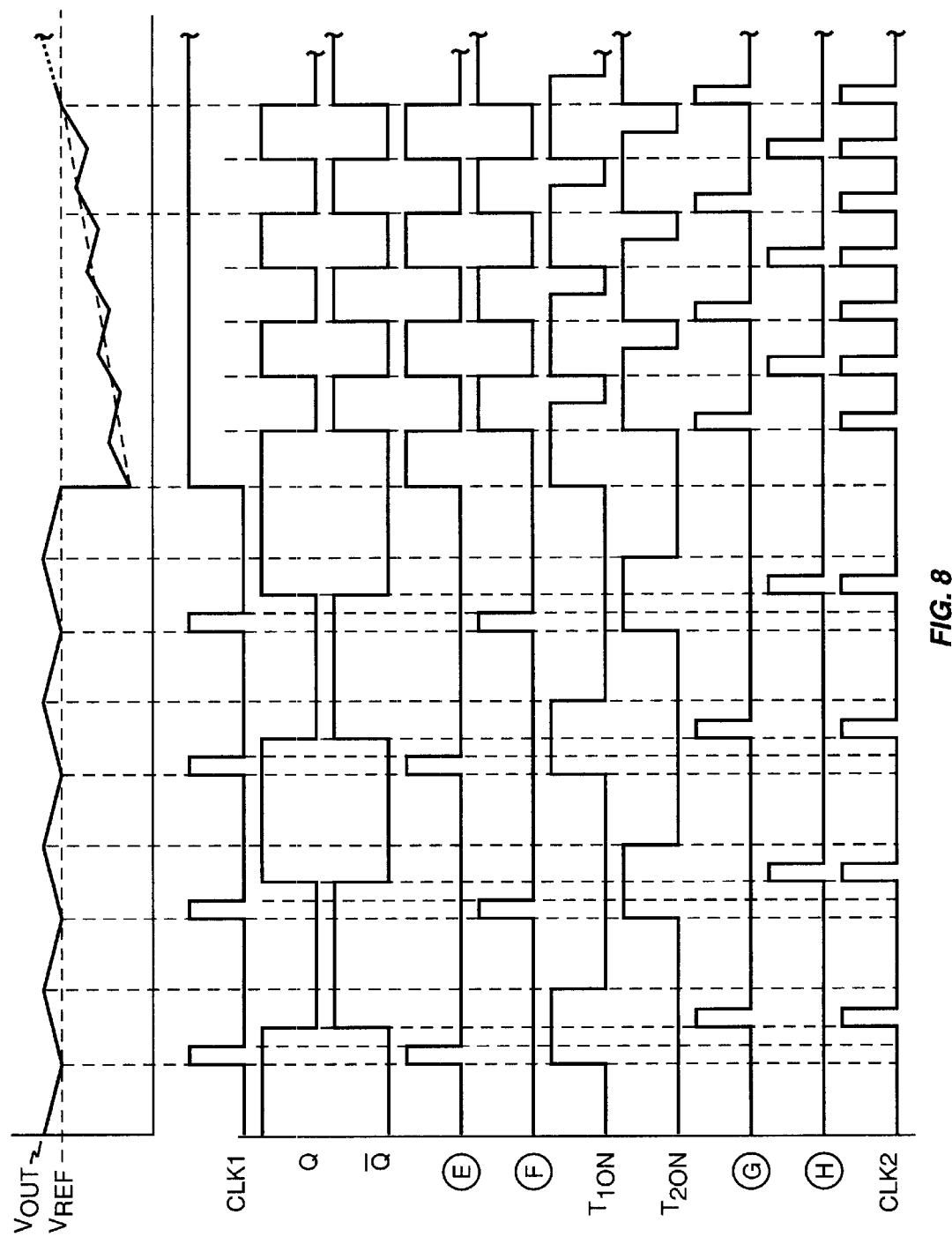
FIG. 8 is a diagram of relevant waveforms for the power supply circuit of FIG. 5 during both steady state and transient conditions.

FIG. 8 illustrates generation of the $\phi_1$ and $\phi_2$ switching pulses, $T_{1ON}$ and $T_{2ON}$, respectively, in first and second operating modes. In the first mode, the DC component of the regulated output voltage $V_{OUT}$ is at the desired level defined by the reference voltage $V_{REF}$. Thus, the CLK1/EN signal from the regulation comparator 50 provides clocking for the controller 42, as the ripple component of $V_{OUT}$ moves above and below $V_{REF}$. In the second operating mode, the level of $V_{OUT}$ is pulled below $V_{REF}$, as might occur with a step change increase in current into the load 16. In the second mode, the feedback clocking of the control logic 44 provided by the blanking circuit 48 allows the controller 42 to continue generating switching pulses. Thus, FIG. 8 depicts operational waveforms for a period of time when the output feedback signal ripples about the reference voltage used to establish the desired voltage for the regulated output signal, and for a period of time when, due to a sudden increase in load current for example, the output feedback signal drops below the reference voltage.

CLK1/EN is the primary clock signal generated by the regulation comparator 50, Q and *Q (Q-bar) are logical signals provided by flip-flop 82, E and F are the outputs from the upper and lower AND gates 80, respectively, $T_{1ON}$ and $T_{2ON}$ are the $\phi_1$ and $\phi_2$ switching pulses, respectively, G and H are the feedback secondary clock pulses provided by the upper and lower pulse generators 74 in the blanking circuit 48, respectively, and CLK2 is the secondary clock signal created by combining the pulses from the pulse generators 74 at the logic gate 76.

In the first operating mode, flip-flop 82 alternately enables the upper and lower AND gates 80, such that assertion of CLK1 alternately initiate pulse generators 70A and 70B. The blanking circuit 48 delays generation of CLK2 pulses such that the OR gate 76 toggles the flip-flop 82 after the regulation comparator 50 has already dropped CLK1 low. Thus, toggling the flip-flop 82 does not trigger either pulse generator 70A or 70B, but does change which AND gate 80 is enabled with respect to the next CLK1 assertion.

In the second operating mode, the regulation comparator 50 holds the CLK1 /EN signal asserted high for the duration of the negative going transient on the regulated output signal. With CLK1/EN held asserted, the output of both AND gates 80 is controlled by the Q and *Q signals from the flip-flop 82. The blanking circuit 48 responds to the rising edge of the switching pulses provided to the switching circuits 14. Thus, the blanking circuit 48 generates a delayed CLK2 pulse for every output switching pulse. The CLK2 pulses cause the control logic 44 to alternately initiate the pulse generators 70A and 70B in self-clocking fashion. The frequency of the CLK2 signal depends upon the blanking delay of the blanking circuit 48. Note that the $\phi_1$ and $\phi_2$ switching pulses maintain the desired 180° of phase separation when the switching controller is self-clocking.

As illustrated, once the voltage $V_{OUT}$ of the output signal moves back up to a level nominally equal to the reference voltage $V_{REF}$, the control logic 44 again begins clocking the controller output circuit 46 in response to the primary clock signal CLK1 provided by the regulation comparator 50. Further, note that behavior of the control logic 44 is such that its self-clocking capabilities are not exercised when the primary clock signal CLK1 becomes static low in overvoltage conditions on $V_{OUT}$. This prevents self-clocking of the switching controller 42 when the output voltage $V_{OUT}$ is already above the desired voltage.

Figure 9:
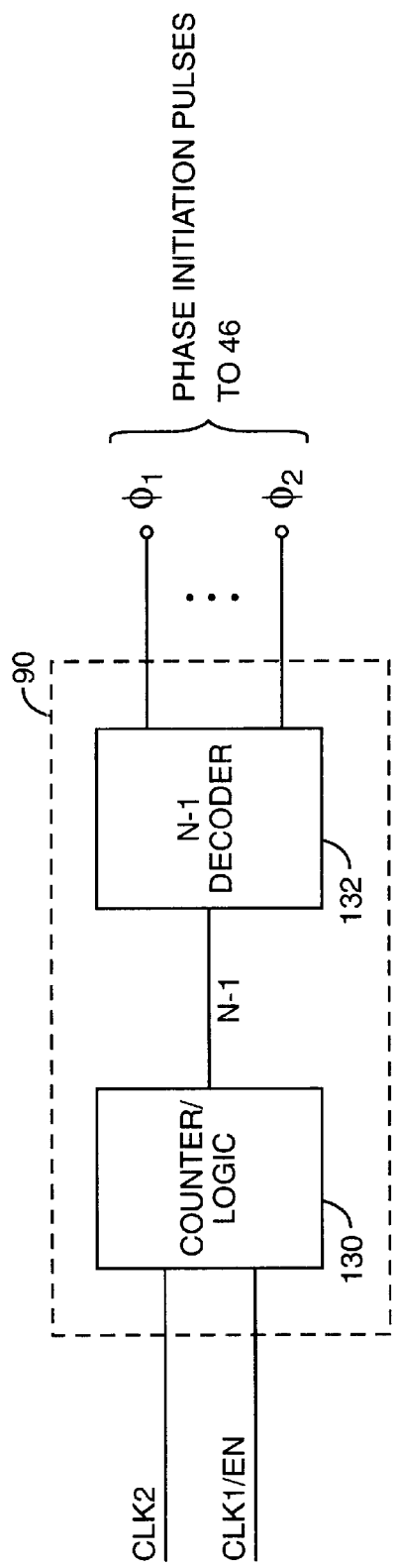
FIG. 9 is an exemplary embodiment of the control logic of FIG. 5 expanded for controlling multiple output phases.

FIG. 9 depicts an exemplary embodiment of the control logic 44 expanded for a plurality of output phases, $\phi_1$ through $\phi_N$, corresponding to a plurality of switching circuits 14. The controller 42 includes a counter 130 that includes control logic, and an N-1 decoder 132. The controller 42 may be adapted to support any number of output phases, while still enjoying the benefits of self-clocking with the desired phase relationships during output voltage transient conditions.

The counter/logic 130 is clocked by either the primary clock signal provided by the regulation comparator 50, or by the secondary clock signal provided by the blanking circuits 48. As with the two-phase implementation illustrated earlier, secondary clock signal allows self-clocking of the controller 42 provided the primary clock signal is in its enabling state. In operation, the counter/logic 130 provides a repeating digital sequence to the decoder 132, which provides pulse initiation signal to each one of the output phases, $\phi_1$ through $\phi_N$ in a desired, repeating phase sequence.

Figure 10:
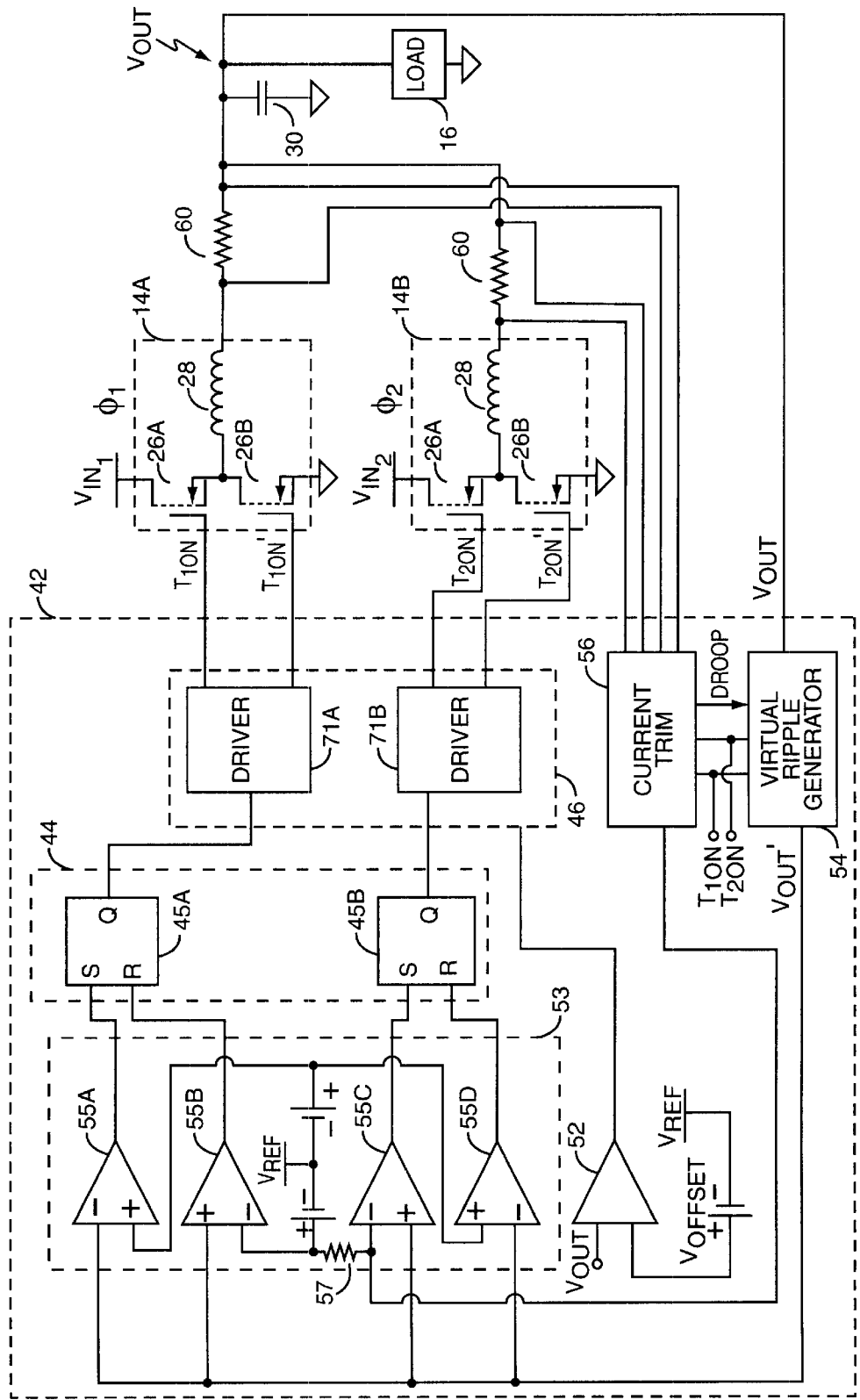
FIG. 10 is a diagram of a power supply as in FIG. 5, but with exemplary details supporting hysteretic ripple-mode regulation.

FIG. 10 is a diagram of a hysteretic control implementation of the controller 42. Its operation is similar to that of the controller illustrated in FIG. 5, but ripple-mode control is based on comparing the feedback signal to upper and lower hysteretic thresholds. Unlike constant on-time control, where the controller output circuit 46 included pulse generation circuits 70A and 70B, the controller output circuit 46 includes gate drivers 71A and 71B for driving the switching circuits 14A and 14B, respectively. The control logic 44 comprises set-reset latches 45A and 45B, which operate to control the drivers 71A and 71 B, respectively.

A comparison network 53 comprises a number of comparators 55 to implement hysteretic control. The comparison network 53 clocks the control logic 44 based on the feedback signal taken from the regulated output $V_{OUT}$. Comparators 55A and 55B provide set and reset signals to the set-reset latch 45A, which, in turn, causes the driver 71A to generate switching pulses for the output switching circuit 14A. The comparators 55C and 55D perform a similar function for the set-reset latch 45B, which corresponds to the driver 71B and the switching circuit 14B.

The comparators 55A . . . 55D have upper and lower hysteretic comparison thresholds established by imparting small voltage offsets above and below the reference voltage $V_{REF}$. Note that active current sharing is provided for in this implementation by isolating the inverting input of the comparator 55C via the resistor 57. This allows the current trim circuit 56 to vary the hysteretic threshold voltage input on the inverting input of the comparator 55C as a function of the current imbalance between switching circuit 14A and switching circuit 14B. In other words, one or more hysteretic thresholds are adjusted based on output phase current imbalances. These adjustments alter the width of switching pulses provided to one or more of the switching circuits 14 to effect balanced current sharing.

Figure 11:
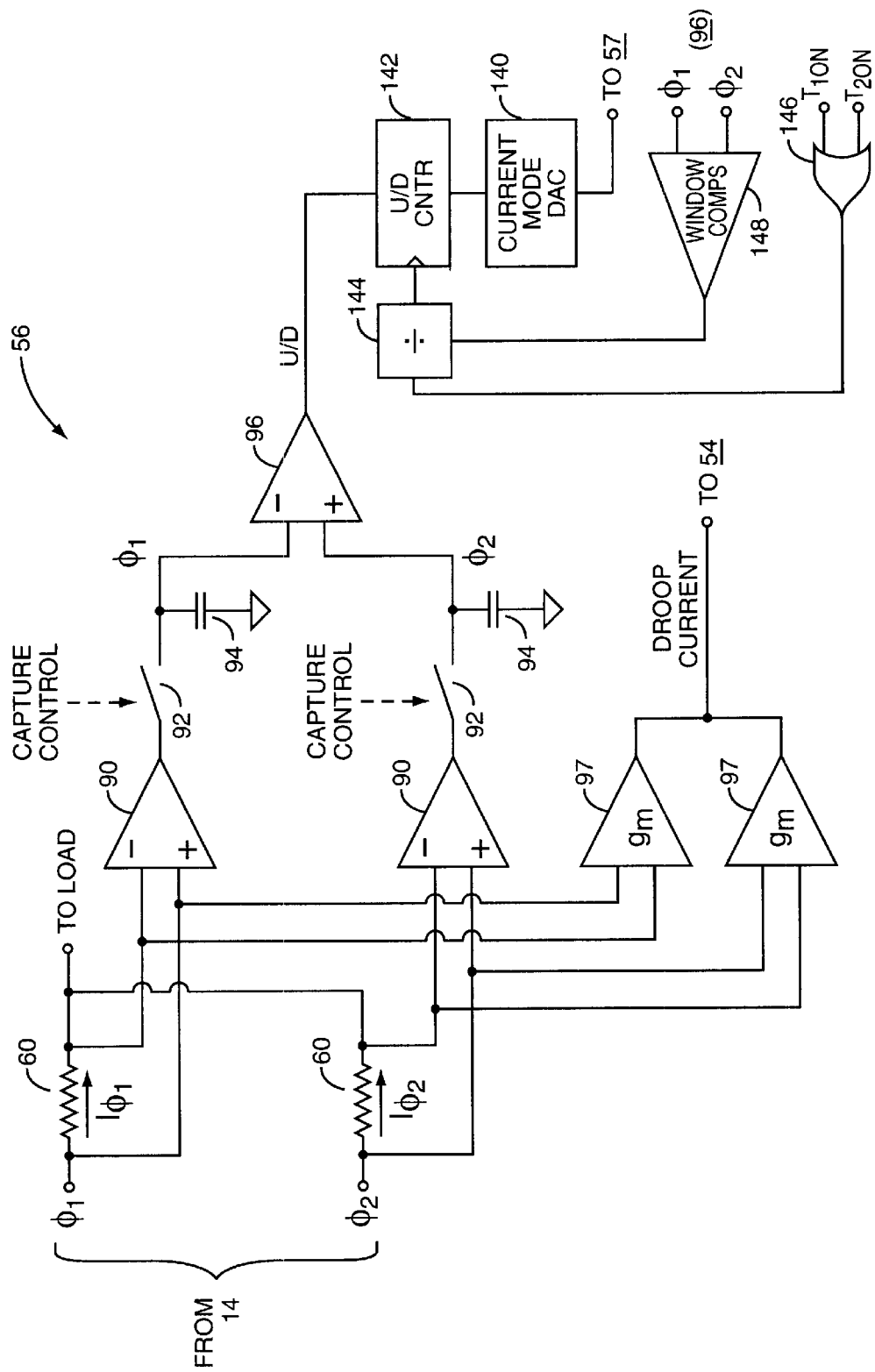
FIG. 11 is a diagram of a current trim circuit adapted for adjustment of hysteretic switching thresholds for the power supply of FIG. 10.

FIG. 11 illustrates an exemplary adaptation of the current trim circuit 56 for use with the hysteretic control of FIG. 10. The circuit is the same as was illustrated in FIG. 6 but includes modifications for providing a control current to the hysteretic comparator network 53 to modulate one or more hysteretic thresholds as a function on phase current imbalance. In this implementation, the current trim circuit 56 generates a control current to generate a controllable voltage offset via the resistor 57 in the hysteretic comparator network. These modifications are reflected in the addition of a current-mode DAC 140, an up/down counter 142, a variable divider 144, a logic gate 146, and one or more window comparators 148.

The comparator 96 controls the counting direction of the counter 142. The counter is clocked by divider 144, which is in turn clocked by the phase switching signals $T_{1ON}$ and $T_{2ON}$ through the logic gate 146. The one or more window comparators 148 set the divider to one of two or more values (e.g., divide-by-1, divide-by-2, etc.) based on the degree to which the phase currents are imbalanced. Thus, the count values into the DAC 140 change faster in the presence of larger errors, and change more slowly when current imbalances are small. Thus, the current output from the DAC 140 into the resistor 57 has a variable gain determined by the degree of current imbalance. This permits fast response in the presence of large errors, and exceptional stability of control once phase current errors are minimized.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A controller for a multi-phase, switch mode power supply, said controller comprising:
    a) a multi-phase control circuit comprising a plurality of output circuits to control different phases of said switch mode power supply, each said output circuit operative to generate a switching signal to regulate a corresponding phase of said switch mode power supply, said control circuit operative to generate said switching signals in dependence on a primary clock signal in a first operating mode and to generate said switching signals in dependence on a secondary clock signal in a second operating mode;
    b) a feedback circuit operative in a first operating mode to generate said primary clock signal as a function of the ripple in a regulated output signal generated by said switch mode power supply; and
    c) a blanking circuit operative to generate said secondary clock signal as a function of said switching signals, said secondary clock signal providing a self-clocking feedback signal to said control circuit in said second operating mode.

2. The controller of claim 1 wherein said blanking circuit comprises circuitry to provide cross-phase blanking such that the switching signal of a first one of said phases triggers generation of the switching signal in a next one of said phases based on feeding back the switching signal from said first one of said phases with a blanking delay that determines the time separation between pulses of said first and second switching signals.

3. The controller of claim 2 wherein said blanking circuit further comprises a feedback pulse generation circuit for each of said phases of said switch mode power supply, and wherein each said feedback pulse generation circuit incorporates said blanking delay such that the switching signals provided to successive ones of said phases are generated as overlapping pulses in time in said second operating mode, but with said defined time separation.

4. The controller of claim 1 wherein said controller functions as a constant on-time controller generating said switching signals as a series of switching pulses with a defined pulse width, and further comprising active current trim circuitry to adjust the amount of load current carried by at least one of said phases of said switch mode power supply by trimming the width of said switching pulses provided to said at least one of said phases.

5. The controller of claim 1 wherein said controller functions as a hysteretic controller generating said switching signals as a series of switching pulses with a pulse width determined by upper and lower comparison voltages in said feedback circuit, and further comprising active current trim circuitry to adjust the amount of load current carried by at least one of said phases of said switch mode power supply by trimming at least one of said upper and lower comparison voltages for said at least one of said phases.

6. The controller of claim 1 wherein said feedback circuit includes a comparator to generate said primary clock signal in said first operating mode by comparing an output feedback signal derived from said regulated output signal with a reference signal in said first operating mode.

7. The controller of claim 6 wherein said comparator initiates a primary clock pulse when said output feedback signal falls below said reference signal, said control circuit responsive to said primary clock pulse to generate said switching signals.

8. The controller of claim 6 wherein said primary clock signal from said comparator functions as an enable signal in said second operating mode to make said control circuit responsive to said secondary clock signal.

9. The controller of claim 1 wherein said control circuit includes enabling logic to enable said control circuit to generate said switching signals based on said secondary clock signal when an enable signal is asserted.

10. The controller of claim 9 wherein said enabling logic comprises a comparator to generate said enable signal in said second operating mode based on comparing an output feedback signal derived from said regulated output signal with a reference signal associated with a desired value for said regulated output signal.

11. The controller of claim 1 wherein said blanking circuit comprises a delay circuit coupled to an output of said control circuit to generate a secondary clock pulse responsive to said switching signals.

12. The controller of claim 1 wherein said blanking circuit comprises a switching signal feedback path for each phase of said multi-phase control circuit, each said switching signal feedback path comprising:
   a) a delay circuit operative to generate a delayed signal responsive to a corresponding switching signal; and
   b) a pulse generator operative to generate a secondary clock pulse for said control circuit in response to said delayed signal.

13. The controller of claim 1 further comprising an out-of-bounds comparator operative to suppress generation of said switching signals when said output signal exceeds a defined threshold.

14. The controller of claim 1 wherein each output circuit comprises an output pulse generator operative to generate a respective one of said switching signals as a sequence of switching pulses for controlling said switching circuit.

15. The controller of claim 14 wherein said output pulse generator comprises:
   a) a latch circuit operative to assert said switching signal responsive to a pulse initiation signal derived from said primary clock in said first operating mode and derived from said secondary clock in said second operating mode;
   b) a ramp circuit operative to initiate a ramp signal upon assertion of said switching signal; and
   c) a comparison circuit operative to de-assert said switching signal by resetting said latch circuit when said ramp signal reaches a comparison threshold.

16. The controller of claim 15 wherein said ramp circuit comprises a slope control circuit to control a slope of said ramp signal based on an input voltage used by said switch mode power supply to generate said regulated output signal, wherein said slope control circuit adjusts a width of said switching pulses based on said input voltage.

17. The controller of claim 16 wherein said comparison circuit comprises a comparator operative to compare said ramp signal to said comparison threshold, and wherein said comparison threshold is proportional to a desired output voltage of said regulated output signal such that said output pulse generator adjusts a width of said switching pulses based on said desired output voltage.

18. The controller of claim 14 further comprising control logic to generate pulse initiation signals responsive to said primary clock signal in said first operating mode and responsive to said secondary clock signal in said second operating mode, said pulse initiation signals causing said output pulse generators to generate said switching pulses.

19. The controller of claim 18 wherein said control logic toggles said pulse initiation signals such that said output pulse generators generate switching pulses with a desired phase relationship.

20. The controller of claim 19 wherein said control logic comprises a counter circuit operative to generate said pulse initiation signals for said plurality of output circuits in a desired sequence such that said switching signals to said plurality of phases of said power supply have a desired phase relationship.

21. The controller of claim 14 wherein at least one of said plurality of output pulse generators is an adjustable pulse generator that includes an adjustment circuit operative to change a width of said switching pulses provided to a corresponding phase of said multi-phase power supply responsive to a trim signal.

22. The controller of claim 21 further comprising a trim circuit operative to generate trim signals for said at least one adjustable pulse generator to control a phase current in said corresponding phase of said multi-phase power supply.

23. The controller of claim 22 wherein said trim circuit comprises at least one phase comparison circuit, each said phase comparison circuit comprising:
   a) a first amplifier operative to generate a first signal proportional to a phase current in a first phase of said multi-phase amplifier;
   b) a second amplifier operative to generate a second signal proportional to a phase current in a second phase of said multi-phase amplifier; and
   c) a comparison circuit operative to generate said trim signal based on comparing said first and second signals.

24. The controller of claim 23 wherein each said phase comparison circuit further comprises sample-and-hold circuits for said first and second signals to permit comparison of said first and second signals when said phase currents in said first and second phases are not simultaneously measured.

25. The controller of claim 1 further comprising a virtual ripple generator operative to generate a feedback signal for said feedback circuit as a composite signal comprising a first component responsive to said output signal, and a second component comprising a ripple signal generated by said virtual ripple generator, said ripple signal having a desired magnitude and synchronized with said switching signals.

26. The controller of claim 25 wherein said ripple in said feedback signal has a minimum ripple amplitude set by said ripple signal generated by said virtual ripple generator, and further wherein said first component of said feedback signal remains responsive to actual ripple and DC offset in said regulated output signal.

27. The controller of claim 1 further comprising a droop circuit operative to vary regulation of said output signal responsive to a magnitude of load current supplied by said output signal, such that said controller regulates a voltage of said regulated output signal at a lower level under conditions of high load current to minimize voltage overshoot on said output signal if said load current suddenly decreases.

28. The controller of claim 1 wherein said controller functions as a constant on-time controller and said output circuits comprise output pulse generators operative to generate an output pulse of a defined width in response to a pulse initiation signal derived from one of said primary and secondary clock signals.

29. The controller of claim 28 further comprising current sensing circuitry operative to sense a current in a first one of said phases of said switch mode power supply relative to a second one of said phases.

30. The controller of claim 29 wherein the output pulse generator corresponding to said first one of said phases comprises an adjustable pulse generator to adjust the width of said output pulses responsive to a trim signal from said current sensing circuitry, said trim signal indicating whether said current in said first one of said phases is greater or less than said current in said second one of said phases.

31. The controller of claim 30 wherein said adjustable pulse generator comprises:
   a) a latch circuit set by one of said pulse initiation signals to assert said output pulse signal;
   b) a ramp circuit to generate a ramping signal started coincident with setting said latch;
   c) a reset circuit to reset said latch and clear said output pulse signal when the value of said ramping signal reaches the value of a comparison signal; and
   d) a digital-to-analog circuit to generate said comparison signal based on a digital count value controlled by said trim signal, whereby the width of said output pulse is determined by said digital count value.

32. The controller of claim 31 wherein said digital-to-analog circuit comprises a variable gain circuit operative to increase the rate of change of said comparison signal when a current imbalance between said first and second phases is above a defined threshold, and decrease the rate of change of said comparison signal when said current imbalance is below said defined threshold.

33. A method of controlling a multi-phase, switch mode power supply, the method comprising:
   a) providing a plurality of switching signals to control different phases of said switch mode power supply, each said switching signal comprising a series of switching pulses to effect regulation of an output signal of said switch mode power supply, said switching pulses being responsive to a primary clock signal in a first operating mode and responsive to a secondary clock signal in a second operating mode;
   b) generating said primary clock signal based on ripple in an output feedback signal derived from said output signal in said first operating mode; and
   c) generating said secondary clock signal based on said switching pulses in said second operating mode to provide self-clocked switching pulse generation.

34. The method of claim 33 wherein switching pulses for said different phases are generated sequentially by feeding back switching signals from said different phases with a blanking delay and generating said switching pulses for said successive phases responsive to delayed pulses of preceding phases such that a desired phase relationship is maintained between said different phases.

35. The method of claim 34 wherein said switching pulses in successive phases overlap.

36. The method of claim 33 further comprising adjusting the current load in a selected one of said different phases by controlling the width of said switching pulses provided to the selected phase.

37. The method of claim 36 wherein said switching pulses are generated by constant on-time pulse generators and wherein the width of said switching pulses is controlled by setting the on-time of said pulse generators.

38. The method of claim 36 wherein said switching pulses are generated by a hysteretic controller and wherein the width of said switching pulses is controlled by changing the hysteretic voltage of said hysteretic controller.

39. The method of claim 33 further comprising:
   a) operating in said first operating mode when a DC component of said output signal is substantially at a desired output voltage; and
   b) operating in said second operating mode when said DC component of said output signal falls below said desired output voltage.

40. The method of claim 33 further comprising:
   a) detecting an over-voltage condition of said output signal; and
   b) suppressing generation of said switching pulses during said over-voltage condition.

41. The method of claim 33 further comprising controlling the width of said switching pulses in proportion to a supply voltage from which said switch mode power supply derives said output signal, such that a frequency of said switching pulses remains substantially constant over a range of supply voltages.

42. The method of claim 41 further comprising controlling said width of said switching pulses in proportion to a desired output voltage of said output signal, such that said frequency of said switching pulses remains substantially constant over a range of desired output voltages.

43. The method of claim 33 further comprising setting the pulse width of said switching pulses provided to each one of said plurality of said output phases based on a value of a supply voltage associated with each one of said plurality of output phases.

44. The method of claim 33 further comprising:
   a) sensing phase currents in at least one of said output phases; and
   b) adjusting the pulse widths of said switching pulses provided to at least one of said output phases to substantially balance said phase currents carried by said output phases.

45. The method of claim 44 further comprising:
   a) designating one of said output phases as a master phase, and designating remaining ones of said output phases as slave phases; and
   b) adjusting the pulse widths of said switching pulses provided to respective ones of said slave phases as a function of a relative difference between said phase current in said master phase current and said phase currents in said slave phases.

46. A constant on-time controller for use in a switch mode power supply providing a regulated output signal, said controller comprising:
   a) a control circuit operative to generate a switching clock responsive to a feedback ripple signal associated with the regulated output signal; and
   b) a pulse generator operative to generate switching pulses responsive to said switching clock to control a switching circuit-to effect regulation of the regulated output signal, said pulse generator comprising:
      i) a pulse output circuit operative to generate said switching pulses; and;
      ii) a pulse width adjustment circuit operative to vary the width of said switching pulses to maintain said switching clock at a substantially constant frequency.

47. The constant on-time controller of claim 46 wherein said pulse output circuit comprises a latch circuit operative to generate said switching pulses by asserting and de-asserting an output switching signal.

48. The constant on-time controller of claim 47 wherein said pulse width adjustment circuit comprises:
  a) a ramp circuit operative to initiate a ramp signal upon assertion of said switching signal; and
  b) a comparison circuit operative to de-assert said switching signal by resetting said latch circuit when said ramp signal reaches a comparison threshold, thereby forming said switching pulse in said switching signal.

49. The constant on-time controller of claim 48 wherein said ramp circuit comprises a slope control circuit to control a slope of said ramp signal based on a supply voltage from which said switching circuit derives said output signal, such that the width of said switching pulses is a function of said supply voltage.

50. The constant on-time controller of claim 48 wherein said comparison circuit comprises a comparator operative to compare said ramp signal to said comparison threshold, and wherein said comparison threshold is proportional to a desired output voltage of said output signal such that the width of said switching pulses is a function of said desired output voltage.

51. The constant on-time controller of claim 49 wherein said pulse width adjustment circuit further comprises a comparison threshold adjustment circuit to vary said comparison threshold responsive to a trim signal, such that said trim signal is operative to vary the width of said switching pulses.

52. The constant on-time controller of claim 51 wherein said comparison threshold adjustment circuit comprises:
  a) a counter operative to increase a count value responsive to a clock signal when said trim signal is in a first state and to decrease said count value responsive to said clock signal when said trim signal is in a second state; and
  b) a digital-to-analog converter operative to generate said comparison threshold based on said count value of said counter.

53. A method of maintaining a substantially constant switching frequency in a constant on-time switching controller for a switch mode power supply providing a regulated output signal, the method comprising:
  a) generating switching pulses responsive to a feedback ripple signal associated with said regulated output signal, said switching pulses switching on and off a switching circuit coupled to a supply voltage to effect regulation of said regulated output signal; and
  b) varying the width of said switching pulses responsive to changes in said supply voltage such that said switching pulses are generated at a substantially constant frequency.

54. The method of claim 53 further comprising varying the width of said switching pulses in response to a change in said supply voltage such that a frequency of said switching pulses remains substantially unchanged.

55. The method of claim 53 further comprising varying the width of said switching pulses in response to a change in a desired regulated output voltage of said regulated output signal such that a switching frequency of said switching pulses remains substantially unchanged over a range of regulated output voltages.

56. The method of claim 53 further comprising providing said switching pulses to each one of a plurality of said switching circuits and varying the width of switching pulses provided to at least one of said switching circuits to adjust an output current of said at least one said switching circuit.

57. A controller for use with a switch mode power supply that includes at least two switching circuits operative to provide a common output signal, said controller comprising:
  a) pulse generators operative to generate switching pulses to said switching circuits to effect regulation of said output signal, wherein at least one said pulse generator is an adjustable pulse generator is operative to vary the width of said switching pulses; and
  b) a trim circuit operative to control said at least one adjustable pulse generator such that a load current collectively provided by said switching circuits is shared between said switching circuits according to a desired manner.

58. The controller of claim 57 wherein said trim circuit generates a trim signal for said at least one adjustable pulse generator responsive to a measured current in at least one of said switching circuits.

59. The controller of claim 58 wherein said trim circuit comprises:
  a) at least one amplifier circuit operative to generate a voltage signal proportional to a current in a respective one of said switching circuits; and
  b) an output circuit operative to generate said at least one trim signal responsive to said voltage signal.

60. The controller of claim 58 wherein said trim circuit comprises:
  a) a first amplifier operative to generate a first signal proportional to a current in a first one of said switching circuits;
  b) a second amplifier operative to generate a second signal proportional to a current in a second one of said switching circuits; and
  c) a comparator circuit operative to set said trim signal to a first state if said first signal exceeds said second signal, and to a second state if said second signal exceeds said first signal.

61. The controller of claim 60 wherein said at least one adjustable pulse generator operative to increase the width of said switching pulses when said trim signal is in said first state, and to decrease the width of said switching pulses when said trim signal is in said second state.

62. The controller of claim 60 wherein said trim circuit further comprises:
  a) a first holding circuit for maintaining a value of said first signal corresponding to an on-state of said first one of said switching circuit; and
  b) a second holding circuit for maintaining a value of said second signal corresponding to an on-state of said second one of said switched output signal;
  c) wherein said first and second holding circuits enable a comparison of said first and second signals despite said first and second ones of said switching circuits being switched on and off at different times.

63. A method of controlling a switch mode power supply comprising a least two switching circuits, the method comprising:
  a) providing switching pulses to said at least two switching circuits to effect regulation of an output signal at a common output of said at least two switching circuits;
  b) varying the width of said switching pulses provided to at least one of said switching circuits to control an amount of load current provided by said at least one of said switching circuits.

64. The method of claim 63 further comprising:
a) sensing the amount of load current provided by first and second ones of said switching circuits; and
b) varying the width of said switching pulses provided to at least one of said first and second switching pulses to substantially balance the load current between said first and second switching circuits.

65. The method of claim 64 further comprising:
a) capturing first and second values corresponding to said amount of load current provided by said first and second switching circuits during respective on states of said first and second switching circuits; and
b) comparing said first and second values to compare said amount of current provided by said first and second switching circuits;
c) wherein capturing said first and second values enables comparison of the amount of load current carried by said first and second switching circuits when said first and second switching circuits are not simultaneously turned on.

* * * * *